(12) United States Patent
Sasaki et al.

(10) Patent No.: US 6,782,090 B1
(45) Date of Patent: Aug. 24, 2004

(54) SWITCHING SYSTEM CONTROL METHOD AND APPARATUS

(75) Inventors: Noriki Sasaki, Kawasaki (JP); Kuniyuki Kishimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/354,184

(22) Filed: Jul. 15, 1999

(30) Foreign Application Priority Data

Oct. 29, 1998 (JP) .......................................... 10-309069

(51) Int. Cl.[7] .............................................. H04M 7/00
(52) U.S. Cl. ................................. 379/220.01; 379/243
(58) Field of Search .......................... 379/210.01, 243, 379/229, 219, 220.01, 221.08, 289

(56) References Cited

U.S. PATENT DOCUMENTS 5,226,075 A * 7/1993 Funk ........................... 379/243
5,757,903 A * 5/1998 Welter ......................... 379/229
6,058,177 A * 5/2000 Newcombe .................. 379/210

FOREIGN PATENT DOCUMENTS

| JP | 5-122756 | 5/1993 |
| JP | 6-209375 | 7/1994 |
| JP | 7-203005 | 8/1995 |
| JP | 9-8958 | 1/1997 |
| JP | 9-18963 | 1/1997 |
| JP | 11-113035 | 4/1999 |

* cited by examiner

*Primary Examiner*—Ahmad F. Matar
*Assistant Examiner*—Rasha Al-Aubaidi
(74) *Attorney, Agent, or Firm*—Katten Muchin Zavis Rosenman

(57) ABSTRACT

A switching system control method controls a plurality of area codes by a single telephone switching system. Area codes and office codes are defined in a corresponding relationship, so that there is no overlap of the office codes and each of the area codes.

12 Claims, 11 Drawing Sheets

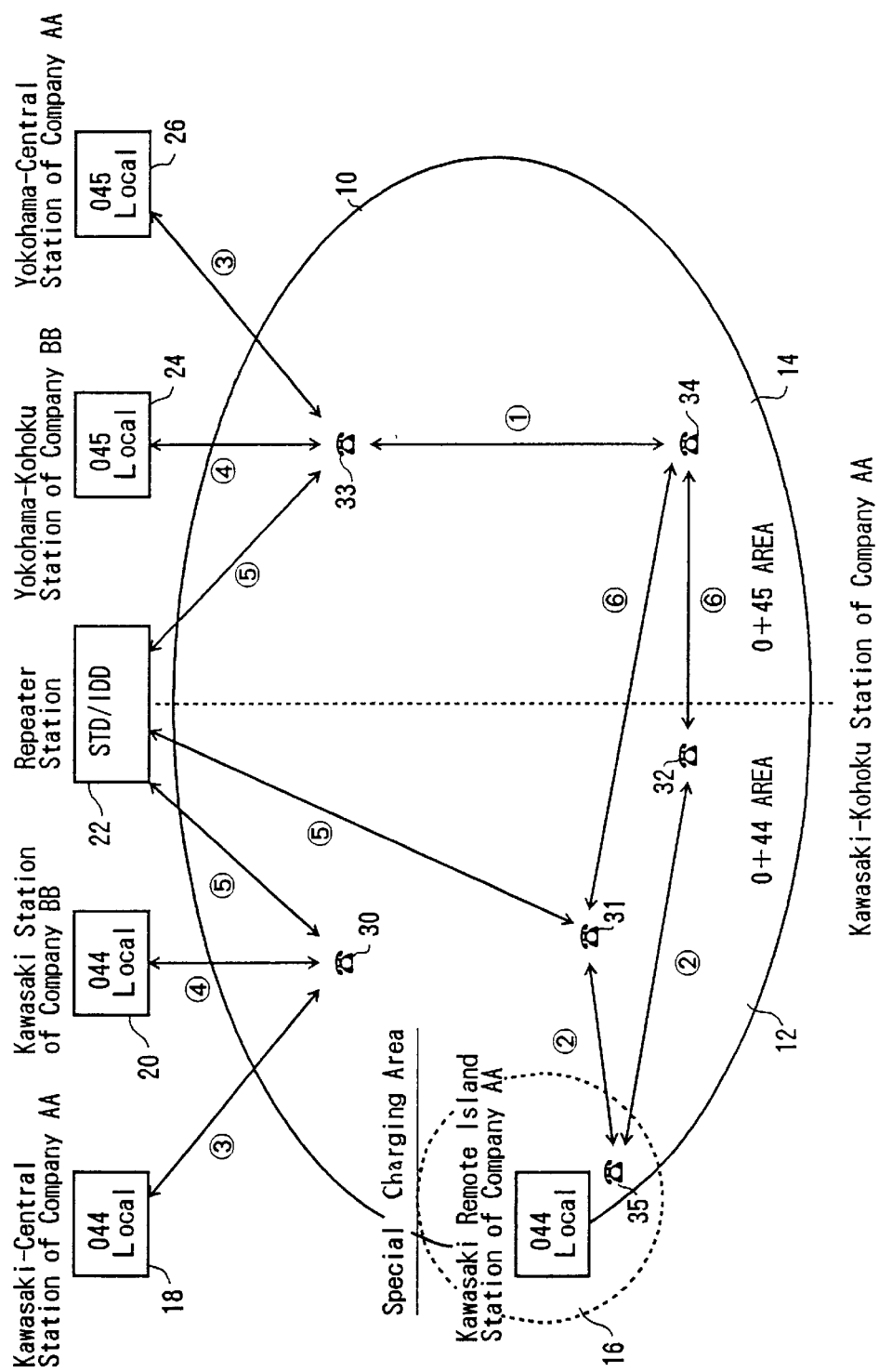

FIG. 2

| CALL CONNECTION PATTERN | DIALING & RECEIVED NUMBERS (DIGITS) | CALLING TELEPHONE NUMBER DISPLAY |
|---|---|---|
| ① INTRA OFFICE CALL WITHIN SAME AREA | S N | S N |
| ② INTRA OFFICE CALL WITHIN SAME AREA BUT TO DIFFERENT ACCOUNTING SYSTEM (SPECIAL CHARGING AREA) | 0 + A C + S N | 0 + A C + S N |
| ③ LOCAL OFFICE CALL WITHIN SAME COMPANY | S N | S N |
| ④ LOCAL OFFICE CALL BETWEEN DIFFERENT COMPANIES | S N | S N |
| ⑤ STD CALL WITHIN SAME COMPANY/ BETWEEN DIFFERENT COMPANIES | 0 + A C + S N | 0 + A C + S N |
| ⑥ INTRA TOLL CALL WITHIN SAME STATION BUT BETWEEN DIFFERENT AREAS | 0 + A C + S N | 0 + A C + S N |

FIG. 4

| Area Code Number | Office Code Number |
|---|---|
| 044 | 100 |
| 044 | 101 |
| 044 | 499 |
| 045 | 500 |
| 045 | 501 |
| 045 | 799 |
| 046 | 800 |

FIG. 5

*NOCTBH*

| | | | NDAC | D4 | D3 | D2 | D1 |
|---|---|---|---|---|---|---|---|
| ARCD | | | DSAN | SAN | M | OFCO | OFCI |
| ARCD2 | ARCD1 | ARCD0 | | | | | |

| | | | |
|---|---|---|---|
| F | (31,1) | : | Effective Display |
| D1-D4 | (4bit) | : | Digit |
| OFCI | (0,4) | : | Called Number Digits 1-4 |
| OFCO | (4,4) | : | Calling Number Digits 1-4 |
| M | (8,4) | : | SN Digits 1-4 (M=0 is 4 digits) |
| SAN | (12,4) | : | Service Area Number 1-15 |
| DSAN | (16,4) | : | Data Call Service Area Number 1-15 |
| ARCD | (20,12) | : | Area Code |
| ARCD0 | (20,4) | : | 1st Digit of Area Code |
| ARCD1 | (24,4) | : | 2nd Digit of Area Code |
| ARCD2 | (28,4) | : | 3rd Digit of Area Code |
| NDAC | (16,4) | : | Number of Digit for Area Code (Digits Display) |

| CPR No. | LC No. | LLC No. |
|---------|--------|---------|
| 1 | 1 | 0 |
| 2 | 3 | 0 |
| 3 | 10 | 1 |
| 4 | 11 | 2 |

FIG. 8

<CHA OFD:TRS,TLR=xx,TLD=xxx,CAT=1,RSTN=x,RSTX=x,
  CHX=x,NOC=x,MAC=X,MAV=xx;
  MAC: 0 Do Not Carry Out Process of Multi toll area code
       1 Calling Without O+AC(SN)
       2 Calling With O+AC
  MAV: 0~63(LLC Number (VAL) With Respect to TLD of Translator)
  CHX: 96 Accounting Between Different Stations,
          or with Special Charging Area

FIG. 9

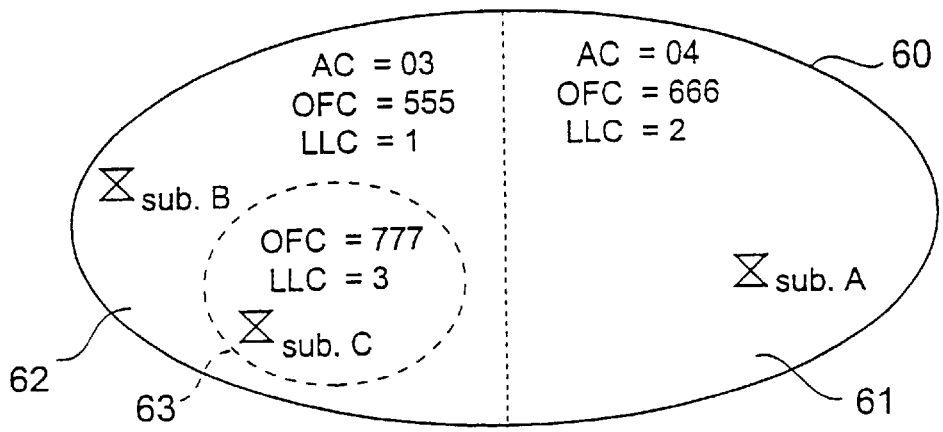

(1) sub. A call(666aaaa)to same AC sub. X
　　<CHA OFD:TRS,TLR=2,TLD=666,CAT=1,RSTN=4,RSTX=4,
　　CHX=x,NOC=x,MAC=1,MAV=2;

(2) sub. B call(555bbbb)to same AC/LLC sub. X
　　<CHA OFD:TRS,TLR=2,TLD=555,CAT=1,RSTN=4,RSTX=4,
　　CHX=x,NOC=y,MAC=1,MAV=1;

(3) sub. C call(777cccc)to same AC/LLC sub. X
　　<CHA OFD:TRS,TLR=2,TLD=777,CAT=1,RSTN=4,RSTX=4,
　　CHX=x,NOC=z,MAC=1,MAV=3;

(4) sub. A/C call(03555bbbb)to sub. B
　　<CHA OFD:TRS,TLR=2,TLD=03555,CAT=1,RSTN=4,RSTX=4,
　　CHX=x,NOC=y,MAC=2,MAV=1;

(5) sub. A/B call(03777cccc)to sub. C
　　<CHA OFD:TRS,TLR=2,TLD=03777,CAT=1,RSTN=4,RSTX=4,
　　CHX=x,NOC=z,MAC=2,MAV=3;

(6) sub. C call(04666aaaa)sub. A
　　<CHA OFD:TRS,TLR=2,TLD=04666,CAT=1,RSTN=4,RSTX=4,
　　CHX=x,NOC=x,MAC=2,MAV=2;

FIG. 10

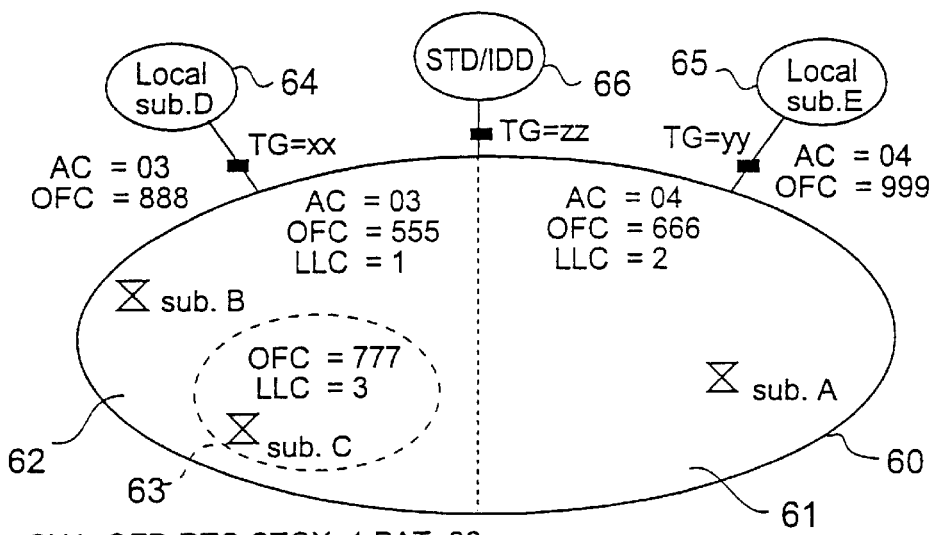

<CHA OFD:RTC,CTGX=1,PAT=30;

(1) sub. A/B/C call to sub. D(888dddd)
   <CHA OFD:TRS,TLR=2,TLD=888,CAT=2,RSTN=4,RSTX=4,
     ODP=0,CTGX=1;
   <CHA OFD:RTC,CTGX=1,VAL=1,TG=xx;
   <CHA OFD:RTC,CTGX=1,VAL=2,ANM=0; (NUT)
   <CHA OFD:RTC,CTGX=1,VAL=3,ANM=0; (NUT)

(2) sub. A/B/C call to sub. D(03888dddd)
   <CHA OFD:TRS,TLR=2,TLD=03888,CAT=2,RSTN=4,RSTX=4,
     ODP=0,CTGX=2;
   <CHA OFD:RTC,CTGX=2,VAL=1,ANM=0; (NUT)
   <CHA OFD:RTC,CTGX=2,VAL=2,TG=zz; (STD call)
   <CHA OFD:RTC,CTGX=2,VAL=3,TG=xx;

(3) sub. A/B/C call to sub. E(999eeee)
   <CHA OFD:TRS,TLR=2,TLD=999,CAT=2,RSTN=4,RSTX=4,
     ODP=0,CTGX=3;
   <CHA OFD:RTC,CTGX=3,VAL=1,ANM=0; (NUT)
   <CHA OFD:RTC,CTGX=3,VAL=2,TG=yy;
   <CHA OFD:RTC,CTGX=3,VAL=3,ANM=0; (NUT)

(4) sub. A/B/C call to sub. E(04999eeee)
   <CHA OFD:TRS,TLR=2,TLD=04999,CAT=2,RSTN=4,RSTX=4,
     ODP=0,CTGX=4;
   <CHA OFD:RTC,CTGX=4,VAL=1,TG=zz; (STD call)
   <CHA OFD:RTC,CTGX=4,VAL=2,ANM=0; (NUT)
   <CHA OFD:RTC,CTGX=4,VAL=3,TG=zz; (STD call)

SWITCHING SYSTEM CONTROL METHOD AND APPARATUS

BACKGROUND OF THE INVENTION

1. Field of the Invention

The present invention generally relates to switching system control methods and apparatuses, and more particularly to a switching system control method and a switching system control apparatus which control a plurality of area codes by a single telephone switching system.

2. Description of the Related Art

Telephones are generally coupled from homes, offices and the like via subscriber lines to a switching system which covers a specific region in which the homes, offices and the like are located. The switching system enables a call by carrying out a connecting process to connect subscribers. For example, in the case of a local call, a line is connected by closing a switch to a subscriber line of the other party if the other party is connected to the same switching system. In addition, in the case of a toll call, the other party is connected to another switching system, and thus, a line is connected by closing a switch to a subscriber line of the other party after connecting to the other switching system.

Presently, due to the network structure used by the telephone company, the general concept is to operate one switching system in one area code region. Accordingly, it is sufficient for the switching system to have a control function for controlling one kind of area code, and a control function for controlling an exchange code (hereinafter referred to as an office code) corresponding to the area code.

However, the performance of the switching system is improving due to the recent technical progress, and the number of lines which can be treated by a single switching system is increasing. Hence, from the point of view of the cost performance, it is desirable that a region which can be treated by a single switching system is large. However, since the existing switching system can only treat one kind of area code, there is a problem in that a modification of the software and a change in the station data must be made on a large scale, in order to add a function of treating a plurality of area codes.

In addition, when a plurality of area codes are treated by a single switching system, the switching system must treat a case where it is unnecessary to send the area code and a case where it is necessary to send the area code, even when connecting the line within the same switching system. Accordingly, in order to accurately provide a call originating telephone number to a subscriber who is registered to receive a call originating telephone number display service, there is a problem in that a process must be carried out to determine whether or not the sending of the area code is necessary. The call originating telephone number display service refers to a service which displays the call originating telephone number at a predetermined part of a telephone set before the user of the telephone set picks up a handset to receive the call.

Furthermore, when the region having the same area code becomes extremely large such that borders at opposite ends of the region are very far away from each other, the accounting system may be different depending on the location within the region. For example, in a case where a remote island and a mainland both belong to a region having the same area code, a switching system exclusively for the island is not provided because the number of lines required for the island is small, and a line connecting process is carried out by the switching system provided in the mainland via a remote concentrating unit (RSU). In such a case, there is a problem in that, although the same area code is used for the island and the mainland, the accounting system is different for the island and the mainland, and the switching system must process the call by distinguish the accounting systems for the island and the mainland.

SUMMARY OF THE INVENTION

Accordingly, it is a general object of the present invention to provide a novel and useful switching system control method and a switching system control apparatus, in which the problems described above are eliminated.

Another and more specific object of the present invention is to provide a switching system control method and a switching system control apparatus, which can control a plurality of area codes by a single switching system.

Still another object of the present invention is to provide a switching system control method and a switching system control apparatus, which can control an accounting system within the same area code.

A further object of the present invention is to provide a switching system control method which controls a plurality of area codes by a single telephone switching system, wherein area codes and office codes are defined in a corresponding relationship so that there is no overlap of the office codes and each of the area codes. According to the switching system control method of the present invention, it is possible to avoid overlap of the office codes controlled by the single telephone switching system. As a result, it is possible to control a plurality of area codes by the single telephone switching system, by making a software modification and an additional change of station data of a relatively small scale.

In the switching system control method, wherein subscriber area information may be defined by distinguishing control regions of the telephone switching system depending on the area codes and accounting systems. In this case, it is possible to detect the line connection between different area codes and the line connection between the same area code but different accounting systems, which are carried out within the single telephone switching system.

Further, the switching system control method may comprise the steps of detecting area codes and office codes of a calling subscriber and a called subscriber, detecting the subscriber area information of the calling subscriber and the called subscriber based on the detected area codes and the detected office codes of the calling subscriber and the called subscriber, and controlling a line connection based on the subscriber area information of the calling subscriber and the called subscriber. In this case, it is possible to control a plurality of area codes by the single telephone switching system.

The switching system control method may further comprise the steps of carrying out an accounting process based on the subscriber area information of the calling subscriber and the called subscriber. In this case, it is possible to control the line connection of different accounting systems within the same area code.

The switching system control method may further comprise the steps of detecting subscriber information based on a telephone number dialed by the calling subscriber, determining a number of digits of a calling telephone number of the calling subscriber to be displayed by a calling telephone number display service, based on the subscriber area information of the calling subscriber and the called subscriber, and displaying the calling telephone number based on the determined number of digits and the detected subscriber information. In this case, it is possible to provide an accurate calling telephone number display service function even in a case where the single telephone switching system controls a plurality of area codes.

In the switching system control method, the subscriber area information may be the same with respect to the same area code of the same telephone switching system and the same accounting system. In this case, it is possible to simply confirm a case where dialing of the area code is unnecessary.

Still another object of the present invention is to provide a switching system control apparatus which controls a plurality of area codes by a single telephone switching system, comprising an office number correspondence management table which defines area codes and office codes in a corresponding relationship so that there is no overlap of the office codes and each of the area codes. According to the switching system control apparatus of the present invention, it is possible to avoid overlap of the office codes controlled by the single telephone switching system. As a result, it is possible to control a plurality of area codes by the single telephone switching system, by making a software modification and an additional change of station data of a relatively small scale.

The switching system control apparatus may further comprise a subscriber area registration table which defines subscriber area information by distinguishing control regions of the telephone switching system depending on the area codes and accounting systems. In this case, it is possible to detect the line connection between different area codes and the line connection between the same area code but different accounting systems, which are carried out within the single telephone switching system.

Further, the switching system control apparatus may further comprise subscriber area information read means for reading the subscriber area information from said subscriber area registration table based on the office codes of the calling subscriber and the called subscriber, and line control means for controlling a line connection based on the subscriber area information of the calling subscriber and the called subscriber. In this case, it is possible to control a plurality of area codes by the single telephone switching system.

The switching system control apparatus may further comprise accounting process means for carrying out an accounting process based on the subscriber area information of the calling subscriber and the called subscriber. In this case, it is possible to control the line connection of different accounting systems within the same area code.

The switching system control apparatus may further comprise subscriber information read means for reading subscriber information from an area code conversion table based on a telephone number dialed by the calling subscriber, digit number determination means for determining a number of digits of a calling telephone number of the calling subscriber to be displayed by a calling telephone number display service, based on the subscriber area information of the calling subscriber and the called subscriber, and display means for displaying the calling telephone number based on the determined number of digits and the detected subscriber information. In this case, it is possible to provide an accurate calling telephone number display service function even in a case where the single telephone switching system controls a plurality of area codes.

In the switching system control apparatus, the subscriber area information may be the same with respect to the same area code of the same telephone switching system and the same accounting system. In this case, it is possible to simply confirm a case where dialing of the area code is unnecessary.

Other objects and further features of the present invention will be apparent from the following detailed description when read in conjunction with the accompanying drawings.

BRIEF DESCRIPTION OF THE INVENTION

FIG. 1 is a diagram showing call connection patterns for a case where a single switching system controls a plurality of area code regions;

FIG. 2 is a diagram showing dialing and received numbers, and calling telephone number displays, with respect to first through sixth call connection patterns;

FIG. 4 is a diagram showing an embodiment of an office number correspondence management table NOCTBH;

FIG. 5 is a diagram showing an embodiment of an area code conversion table ACCT;

FIG. 8 is a diagram showing an embodiment of the structure of the TRC information of an intra office call and an intra toll call;

FIG. 9 is a diagram for explaining the embodiment of the TRC information of the intra office call and the intra toll call;

FIG. 10 is a diagram for explaining an embodiment of the TRC information of a local office call;

DESCRIPTION OF THE PREFERRED EMBODIMENTS

Figure 3:
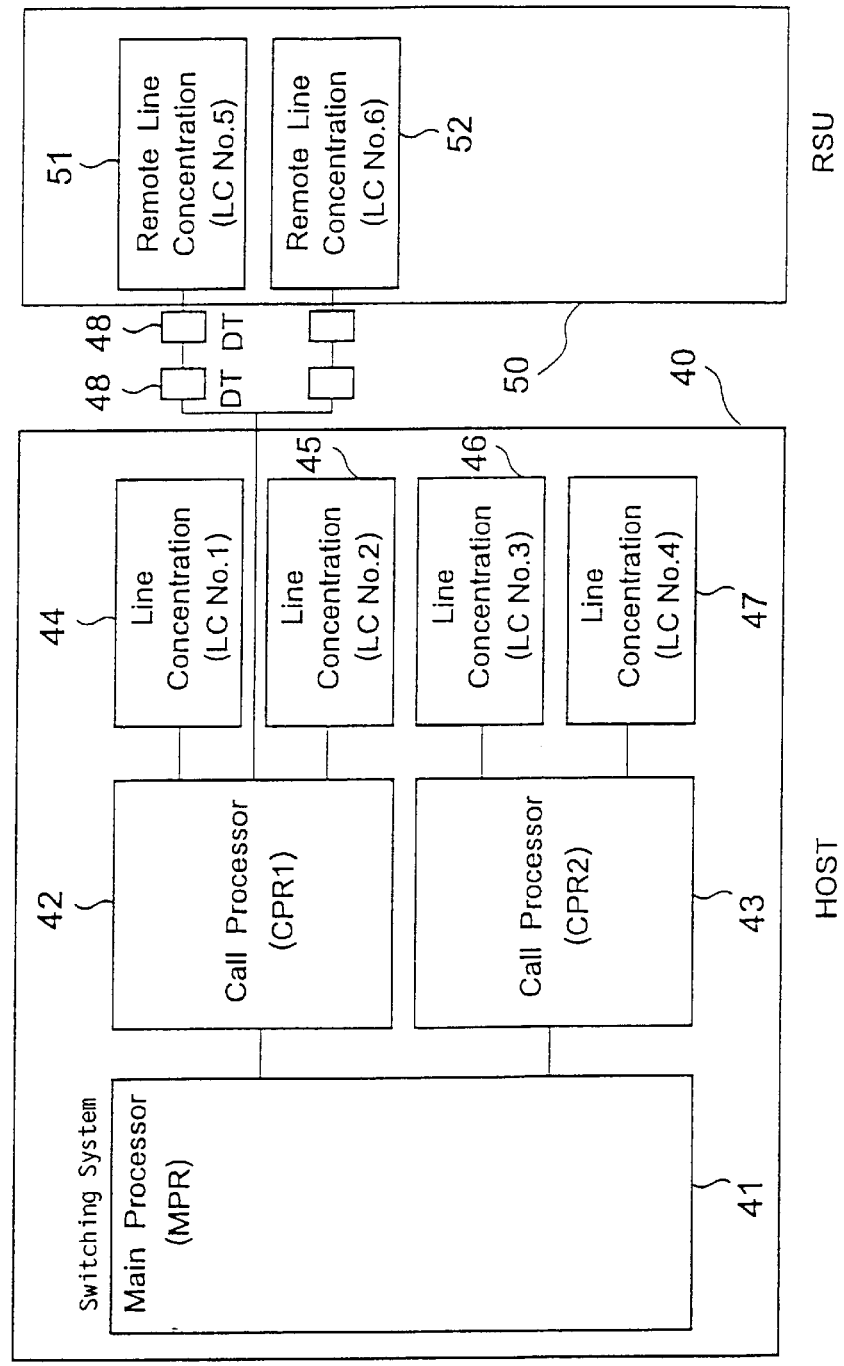
FIG. 3 is a system block diagram showing a host station and a remote concentrating unit (RSU) station of a switching system.

A description will be given of an embodiment of a switching system control apparatus according to the present invention. This embodiment of the switching system control apparatus employs an embodiment of a switching system control method according to the present invention.

FIG. 1 is a diagram showing call connection patterns for a case where a single switching system controls a plurality of area code regions. The area code is sometime also referred to as a toll number. In addition, the call connection refers to the process of connecting a line between a calling (call originating) party and a called (call receiving) party based on a telephone number sent by the calling party.

In FIG. 1, a switching system of a Kawasaki-Kohoku station of a company AA covers a control region 10. The control region 10 is made up of a "044" area code region 12 and a "045" area code region 14, and a control of a call connection is carried out with respect to the control region 10 by the single switching system of the Kawasaki-Kohoku station. Next, a description will be given of the call connection patterns of the single switching system of the Kawasaki-Kohoku station.

FIG. 2 is a diagram showing dialing and received numbers (digits), and calling (call originating) telephone number displays, with respect to first through sixth call connection patterns.

According to the first call connection pattern ①, a call connection is made within the same area code region, and such a call connection is referred to as a intra office call. In FIG. 2, SN denotes the subscriber number, and AC denotes the area code. For example, a call which is made between a telephone subscriber 33 and a telephone subscriber 34 who both belong to the "045" area code region 14, is a intra office call because the call is made within the same area code region. In the case of the intra office call, a calling party can connect to a called party by successively dialing an office code and a subscriber number. The office code is referring to the exchange code. In addition, according to the calling telephone number display service which displays the calling telephone number at a predetermined part of the telephone set before the called party picks up the handset, the subscriber number is displayed.

According to the second call connection pattern ②, a call connection is made within the same area code region, but an intra office call is made to a special charging area 16 which employs an accounting system different from that employed by the remaining parts of the "044" area code region 12. For example, in a case where a remote island (Kawasaki Remote Island station) and a mainland both belong to the same "044" area code region 12, a switching system exclusively for the island is not provided because the number of lines required for the island is small, and a line connecting process is carried out by the switching system provided in the mainland via a remote concentrating unit (RSU). In such a case, it is necessary to distinguish the second call connection pattern from the first call connection pattern, since accounting systems are different between the two even though the call is made within the same "044" area code region 12.

In the case of the second call connection pattern, the calling party can connect to the called party by successively dialing "0", the area code and the subscriber number. The "0" which is first dialed is called a toll identification number of a toll prefix. Moreover, according to the calling telephone number display service, the "0", the area code and the subscriber number are successively displayed on the telephone set. In the following description, it is assumed for the sake of convenience that the toll identification number is included in the area code.

According to the third call connection pattern ③, a call connection is made to another switching system of the same company, and such a call connection to another switching system is also referred to as a local office call. For example, a call which is made between the telephone subscriber 33 within the "045" area code region 14 and a telephone subscriber within a control region of a switching system of a Yokohama-Central station 26 is a local office call, because the call is made between the switching system of the Kawasaki-Kohoku station of the company AA and the switching system of the Yokohama-Central station 26 of the same company AA, where the two switching systems are independent. In the case of such a local office call, the calling party can connect to the called party by dialing the subscriber number. Further, according to the calling telephone number display service, the subscriber number is displayed on the telephone set.

According to the fourth call connection pattern ④, a local office call connects to another switching system of another company. For example, a call made between the telephone subscriber 33 within the "045" area code region 14 of the company AA and a telephone subscriber within a control region of a switching system of a Yokohama-Kohoku station 24 of a company BB, must be distinguished from the third call connection pattern, since the call is made between the switching system of the Kawasaki-Kohoku station of the company AA and another switching system of the company BB which is different from the company AA. In the case of such a local office call, the calling party can connect to the called party by dialing the subscriber number. In addition, the subscriber number is displayed on the telephone set according to the calling telephone number display service.

According to the fifth call connection pattern ⑤, a call connection which makes a direct dial-in long-distance call (hereinafter simply referred to as a STD) and an international direct dial-in call (hereinafter simply referred to as an IDD) is referred to as a STD call. For example, the STD and IDD which are made by the telephone subscriber 33 within the "045" area code region 14 via a repeater station 22 are referred to as STD calls. In the case of the fifth call connection pattern, the calling party can connect to the called party by successively dialing the area code and the subscriber number. In addition, the area code and the subscriber number are successively displayed on the telephone set according to the calling telephone number display service.

According to the sixth call connection pattern ⑥, a call connection is made within the control region of the same switching system, but the area code regions may differ within the control region. Such a call connection is referred to as a intra toll call. For example, a call which is made between a telephone subscriber 31 of the "044" area code region 12 and the telephone subscriber 34 of the "045" area code region 14 is an intra toll call because the area code regions 12 and 14 are different, even though the call is made within the same control region 10 of the switching system of the Kawasaki-Kohoku station of the company AA. In the case of the sixth call connection pattern, the calling party can connect to the called party by successively dialing the area code and the subscriber number. In addition, the area code and the subscriber number are successively displayed on the telephone set according to the calling telephone number display service.

Therefore, when controlling a plurality of area code regions by a single switching system, it is necessary to carry out the connecting process by distinguishing the first through sixth call connection patterns.

Next, a description will be given of the basic construction of the switching system, by referring to FIG. 3. FIG. 3 is a system block diagram showing a host station of the switching system and a remote concentrating unit (RSU) station.

As shown in FIG. 3, a host station 40 of the switching system includes a main processor (MPR) 41, call processors (CPRs) 42 and 43, and line concentrators (LCs) 44 through 47.

The main processor 41 executes a program for realizing a process of controlling a plurality of area codes by a single switching system, as will be described later, and controls the call processors 42 and 43.

The call processor 42 controls remote line concentrators (RLCs) 51 and 52 within a RSU station 50 which is coupled to the host station 40 via the line concentrators 44 through 47 and digital trunk amplifiers (DTs) 48, in response to a command received from the main processor 41. On the other hand, the call processor 43 controls the line concentrators 44 through 47 in response to a command from the main processor 41.

The line concentrators 44 through 47 and the remote line concentrators 51 and 52 are respectively coupled to a plurality of homes or the like via subscriber lines, and a line connecting process is carried out under the control of the call processors 42 and 43. For example, in the case shown in FIG. 1, the Kawasaki-Kohoku station of the company AA corresponds to the host station 40, and the Kawasaki Remote Island station corresponds to the RSU station 50.

Next, a description will be given of a method of controlling the plurality of area codes by the single switching system. When controlling the plurality of area codes by the single switching system, it is necessary to carry out the connecting process by distinguishing the first-through sixth call connection patterns shown in FIG. 2. Hence, in order to enable control of the plurality of area codes by the single switching system, an office number correspondence management table NOCTBH is prepared, which table NOCTBH indicates the correspondence between the area codes and the office codes within the same switching system.

FIG. 4 is a diagram showing an embodiment of the table NOCTBH. As shown in FIG. 4, a corresponding relationship exists between the area codes and the office codes within the same switching system. For example, according to the table NOCTBH shown in FIG. 4, the office codes "100", "101" and "499" correspond to the area code "044", and the office codes "500", "501" and "799" correspond to the area code "045" and the office code "800" corresponds to the area code "046". In other words, the office code is always different for a different area code, and the office codes do not overlap for different area codes. For this reason, it is possible to uniquely specify the area code by specifying the office code.

FIG. 5 is a diagram showing an embodiment of an area code conversion table ACCT. The office number correspondence management table NOCTBH shown in FIG. 4 is obtained by extracting a part of the area code conversion table ACCT shown in FIG. 5.

The area code conversion table ACCT includes data for obtaining the correspondence between the area codes and the office codes. The data included in the area code conversion table ACCT include an effective display part F, a digit parts D1 through D4, a called number of digit part OFCI, a calling number of digit part OFCO, a service area number part SAN, a data call service area number part DSAN, an area code part ARCD, and a number of digit for area code part NDAC.

The effective display part F indicates whether or not the data following the effective display part F is valid. The digit parts D1 through D4 indicate the office code. The called number of digit part OFCI indicates the number of digits of the called (call receiving) telephone number, and the calling number of digit part OFCO indicates the number of digits of the calling telephone number. The area code part ARCD indicates the area code, and the number of digit for area code part NDAC indicates the number of digits of the area code.

Accordingly, it is possible to detect an area code which corresponds 1:1 with respect to the office code, by using the area code conversion table ACCT.

For example, in this embodiment, the effective display part F is (31, 1), the digit parts D1 through D4 amount to 4 bits, the called number of digit part OFCI is 1 to 4 and is (0, 4), for example, and the calling number of digit part OFCO is 1 to 4 and is (4, 4), for example. The service area number part SAN is 1 to 15, and is (12, 4), for example, and the data call service area number part DSAN is 1 to 15 and is (16, 4), for example. The area code part ARCD is (20, 12). The number of digit for area code part NDAC is (20, 12), and is made up of a first digit of area code ARCD0 which is (20, 4), a second digit of area code ARCD1 which is (24, 4), and a third digit of area code ARCD2 which is (28, 4). The number of digit for area code NDAC is (16, 4). In FIG. 5, M denotes a number of digit for subscriber number which is 1 to 4, and is (8, 4), for example. The number of digit for subscriber number is 4 digits when M=0.

Figures 6, 7:
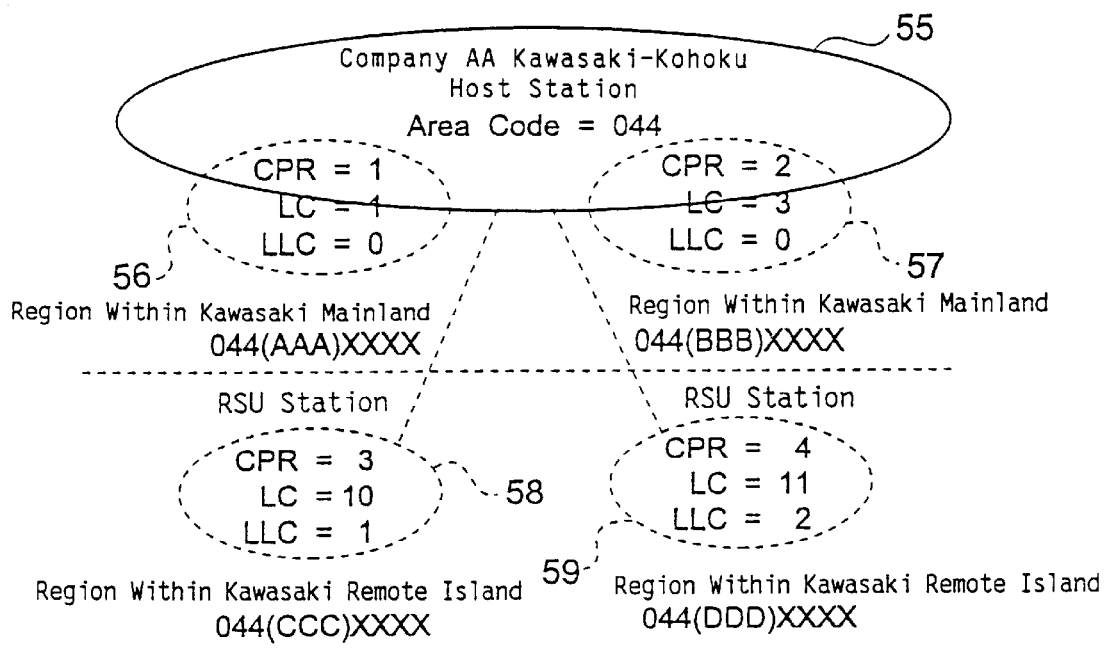
FIG. 6 is a diagram for explaining an embodiment of a local line concentration which is determined by the host station of the switching system and the RSU station.
FIG. 7 is a diagram showing an embodiment of a LLC registration table.

Next, a description will be given of a method of identifying the first through sixth call connection patterns shown in FIG. 2, by referring to FIGS. 6 and 7. FIG. 6 is a diagram for explaining an embodiment of a local line concentrator (LLC) which is determined by the host station of the switching system and the RSU station. In addition, FIG. 7 is a diagram showing an embodiment of a LLC registration table (or subscriber area registration table)).

In FIG. 6, a Kawasaki-Kohoku host station of a company AA covers a "044" area code region 55. This Kawasaki-Kohoku host station includes the main processor 41 shown in FIG. 3, and the main processor 41 controls the call connection in regions 56 and 57 within Kawasaki mainland and regions 58 and 59 within Kawasaki remote island shown in FIG. 6.

In the following description, a call processor (CPR) number indicates a number assigned to the CPR which controls the call connection in the region. In addition, a line concentrator (LC) number indicates a number assigned to the LC which controls the call connection in the region, and a local line concentrator (LLC) number (or subscriber area information) indicates a number assigned to the LLC which controls the call connection in the region. In the case of a host station, the LLC number "0" is assigned thereto. Accordingly, the call connection between the LLCs both having the LLC number "0" is an intra office call. In the case of RSU stations, the LLC numbers "1", "2", "3", . . . are successively assigned to each of the RSU stations, and the same LLC number is set when using the same RSU station. Hence, the call connection between the LLCs having different LLC numbers is an intra toll call between different areas.

In FIG. 6, the region 56 is controlled by the CPR having the CPR number "1" and the LC having the LC number "1", and the LLC number of the LLC is set to "0". The region 57 is controlled by the CPR having the CPR number "2" and the LC having the LC number "2", and the LLC number of the LLC is set to "0". On the other hand, the region 58 is controlled by the CPR having the CPR number "3" and the LC having the LC number "10", and the LLC number of the LLC is set to "1". The region 59 is controlled by the CPR having the CPR number "4" and the LC having the LC number "11", and the LLC number of the LLC is set to "2".

The CPR numbers, the LC numbers and the LLC numbers which are set as described above are registered in the LLC registration table shown in FIG. 7.

In order to control the plurality of area codes by the single switching system, a translator routing control (TRC) information is set by a maintenance command. The TRC information defines the call connection pattern of the telephone subscriber. Next, a description will be given of the TRC information of the first through sixth call connection patterns shown in FIG. 2, by referring to FIGS. 8 and 9. FIG. 8 is a diagram showing an embodiment of the structure of the TRC information of the intra office call and hte intra toll call. In addition, FIG. 9 is a diagram for explaining the embodiment of the TRC information of the intra offce call and the intra toll call.

In FIG. 8, the TRC information of the intra office call and the intra toll call between different areas include a translator routing (TLR), translator digit (TLD), category of the translator table (CAT), reset digit length (RSTN), rest digit length (RSTX), charging index (CHX), normalized office code (NOC), multi area code (MAC), and multi area value (MAV).

The TLR includes information which is used to identify the switching type, and the TLD includes information which indicates the translator number such as the area code and the office code.

The MAC includes information related to a plural area code process, and indicates whether or not to carry out the plural area code process and whether or not to make a call connection by adding the area code to the subscriber number. MAC=0 indicates that no plural area code process is to be carried out. MAC=1 indicates that the call connecting process is to be carried out without the area code. MAC=2 indicates that the call connecting process is to be carried out by adding the area code to the subscriber number.

The MAV includes information which defines an area with respect to the translation result (called number) shown in FIG. 6, for example, and corresponds to the LLC number. The MAV is used to distinguish the intra office call and the intra toll call between the areas. In addition, the CHX includes information which is related to accounting, and distinguishes cases where the call connections are made to another switching station and a special charging area.

Next, a more specific description will be given of the TRC information of the intra office call and the intra toll call between the different areas, by referring to FIG. 9. In FIG. 9, it is assumed for the sake of convenience that the switching system covers a control region 60. The control region 60 is made up of a "04" area code region 61 and a "04" area code region 62. The "03" area code region 62 includes a special charging area 63 which is controlled by a RSU station.

For example, when a telephone subscriber A in the "04" area code region 61 calls a telephone subscriber in the same "04" area code region 61, the TRC information is formed as indicated by (1) in FIG. 9. Since the call connection is made within the same "04" area code region 61 in this case, there is no need to add the area code to the subscriber number, and the MAC is "1". In addition, the MAV is "2" because the LLC number of the called telephone subscriber is "2".

When a telephone subscriber B in the "03" area code region 62 calls a telephone subscriber in the same "03" area code region 62 and in the same LLC number area, the TRC information is formed as indicated by (2) in FIG. 9. Because the call connection is made within the same "03" area code region 62 and in the same LLC number area in this case, there is no need to add the area code to the subscriber number, and the MAC is "1". Further, the MAV is "1" since the LLC number of the called telephone subscriber is "1".

On the other hand, when a telephone subscriber C in the special charging area 63 calls a telephone subscriber in the same "03" area code region 62 and in the same LLC number area, the TRC information is formed as indicated by (3) in FIG. 9. Because the call connection is made within the same "03" area code region 62 and in the same LLC number area in this case, there is no need to add the area code to the subscriber number, and the MAC is "1". Further, the MAV is "3" since the LLC number of the called telephone subscriber is "3".

In addition, when the telephone subscribers A or C calls the telephone subscriber B, the TRC information is formed as indicated by (4) in FIG. 9. Because the call connection between the telephone subscriber A and the telephone subscriber B is a call connection between different areas, it is necessary to add the area code to the subscriber number. On the other hand, in the case of the call connection between the telephone subscriber C and the telephone subscriber B, since the telephone subscriber C is in the special charging area 63 in which the accounting system used is different from that used in the other areas of the "03" area code region 62, it is necessary to add the area code to the subscriber number. Accordingly, the MAC is "2" in this case, and the MAV is "1" because the LLC number of the called telephone subscriber (B) is "1".

When the telephone subscriber A or B calls the telephone subscriber C, the TRC information is formed as indicated by (5) in FIG. 9. In the case of the call connection between the telephone subscriber A or B and the telephone subscriber C, since the telephone subscriber C is in the special charging area 63 in which the accounting system used is different from that used in the "04" area code region 61 or the other areas of the "03" area code region 62, it is necessary to add the area code to the subscriber number. Accordingly, MAC is "2" in this case, and the MAV is "3" because the LLC number of the called telephone subscriber (C) is "3".

When the telephone subscriber C calls the telephone subscriber A, the TRC information is formed as indicated by (6) in FIG. 9. Since the call connection between the telephone subscriber C and the telephone subscriber A is a call between different area codes and the telephone subscriber C is in the special charging area 63 which uses a different accounting system, it is necessary to add the area code to the subscriber number. Accordingly, the MAC is "2", and the MAV is "2" because the LLC number of the called telephone subscriber A is "2".

Next, a description will be given of the TRC information of the local office call, by referring to FIG. 10. FIG. 10 is a diagram showing an embodiment of the TRC information of the local office call. In FIG. 10, those parts which are the same as those corresponding parts in FIG. 9 are designated by the same reference numerals, and a description thereof will be omitted.

In FIG. 10, the TRC information of the local office call includes a TLR, TLD, CAT, RSTN, RSTX, overlap indication (ODP), conditional route index (CTGX), VAL, TG and ANM, where the VAL includes information which indicates the LLC number, the TG includes information which indicates a path of the local office call, and the ANM includes information which indicates whether or not the local office call is possible.

More particularly, the TRC information of the local office call is set depending on the call connection pattern, and information which indicates whether or not the local office call is possible is set for each call connection pattern of the calling telephone number. For example, when the telephone subscriber A, B or C calls a telephone subscriber D in a control region 64 covered by another switching system by dialing the subscriber number, the TRC information is formed as indicated by (1) in FIG. 10. In this call connection pattern, the CTGX of change of routing control (RTC) information is set to "1".

When the CTGX is "1" and the telephone subscriber A, B or C makes the call by dialing the subscriber number, it is possible to make the call connection only for the area having the same area code and the same LLC number as the telephone subscribers A, B and C. For this reason, in a case where the VAL (LLC) is "1", the call connection is made by using a line "xx". On the other hand, in a case where the VAL is "2" or "3", the ANM is set to "0" because no call connection can be made. Actually, when the telephone subscriber makes a process in which the ANM is "0", a voice guidance or the like is output by a known means so as to notify the telephone subscriber that the call connection cannot be made.

In addition, when the telephone subscriber A, B or C calls the telephone subscriber D in the control region 64 of the other switching system by successively dialing the area code and the subscriber number, the TRC information is formed as indicated by (2) in FIG. 1. In this call connection pattern, the CTGX of the RTC information is set to "2".

When the CTGX is "2" and the telephone subscriber A, B or C makes the call by successively dialing the area code and the subscriber number, it is possible to make the call connection for the areas not having the same area code and the same LLC number as the telephone subscribers A, B and C. For this reason, in a case where the VAL is "3", the call connection is made by using the line "xx". On the other hand, in a case where the VAL is "1", the ANM is set to "0" because no call connection can be made. In a case where the VAL is "2", the call connection is made via a repeater station 66 by using a line "zz".

The TRC information is similarly formed as indicated by (3) or (4) in FIG. 10 when the telephone subscriber A, B or C makes the call to a telephone subscriber E in a control region 65 of another switching system.

Next, a description will be given of a plural area code control method which controls the plurality of area codes by the single switching system, using the office number correspondence management table NOCTBH, the area code conversion table ACCT, the LLC registration table and the TRC information which are set as described above, by referring to FIG. 11.

Figure 11:
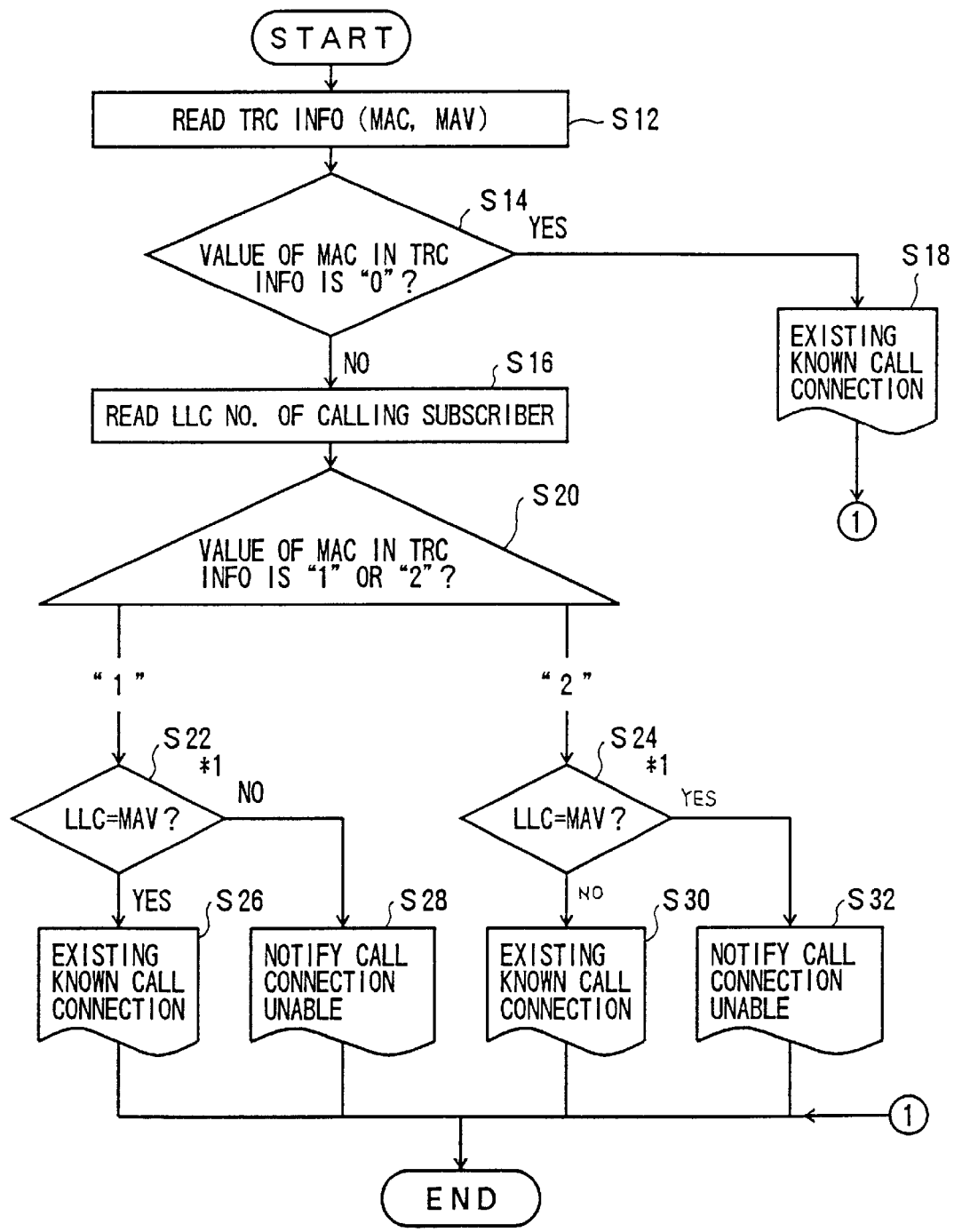
FIG. 11 is a flow chart for explaining an embodiment of a plural area code control method employed in the embodiment of the present invention.

FIG. 11 is a flow chart for explaining an embodiment of the plural area code control method employed in this embodiment of the present invention. When the telephone subscriber dials a telephone number, the switching system in a step S12 reads the TRC information, that is, particularly the MAC and the MAV, of the called subscriber telephone number, and the process advances to a step S14. The step S14 decides whether or not the value of the MAC included in the read TRC information is "0".

If the decision result in the step S14 is YES, the process advances to a step S18 and an existing known call connection is made, because when the MAC is "0", it is indicated that no plural area code process is carried out. On the other hand, if the decision result in the step S14 is NO, the process advances to a step S16 which reads the LLC number of the calling subscriber from the LLC registration table. This step S16 functions as a subscriber region information read means. The process advances to a step S20 after the step S16.

The step S20 decides whether the value of the MAC included in the read TRC information is "1" or "2". If the value of the MAC is "1", the process advances to a step S22 because it is unnecessary to add the area code to the subscriber number. The step S22 decides whether or not the LLC number read in the step S16 matches the value of the MAV included in the read TRC information. In this case, the MAV indicates the LLC number of the called subscriber.

If the decision result in the step S22 is YES, it is possible to make the call connection by dialing the subscriber number because the calling subscriber and the called subscriber have the same area code and the same LLC number. Hence, if the decision result in the step S22 is YES, a step S26 carries out an existing known call connection. On the other hand, if the decision result in the step S22 is NO, it is not possible to make the call connection by dialing only the subscriber number since the calling subscriber and the called subscriber do not have the same area code and the same LLC number. Hence, if the decision result in the step S22 is NO, a step S28 notifies the calling subscriber by a voice guidance or the like that the call connection cannot be made.

If the value of the MAC included in the read TRC information is "2", the process advances to a step S24 after the step S20 because, in this case, it is necessary to add the area code to the subscriber number. The step S24 decides whether or not the LLC number read in the step S16 and the value of the MAV included in the read TRC information match.

If the decision result in the step S24 is NO, the calling subscriber and the called subscriber do not have the same area code and the same LLC number, and thus, it is possible to make the call connection by successively dialing the area code and the subscriber number. Hence, if the decision result in the step S24 is NO, a step S30 carries out an existing known call connection. On the other hand, if the decision result in the step S24 is YES, the calling subscriber and the called subscriber have the same area code and the same LLC number, and the call connection cannot be made by successively dialing the area code and the subscriber number. Accordingly, if the decision result in the step S24 is YES, a step S32 notifies the calling subscriber by a voice guidance or the like that the call connection cannot be made.

The process ends after the steps S18, S26, S28, S30 and S32. The steps S20 through S32 function as a line control means.

According to the process shown in FIG. 11, it is possible to confirm whether or not the calling subscriber and the called subscriber have the same area code and the same LLC number, by comparing the LLC number and the value of the MAV. For this reason, it is possible to carry out the existing known call connection only when the calling telephone number is based on the call connection pattern.

Figure 12:
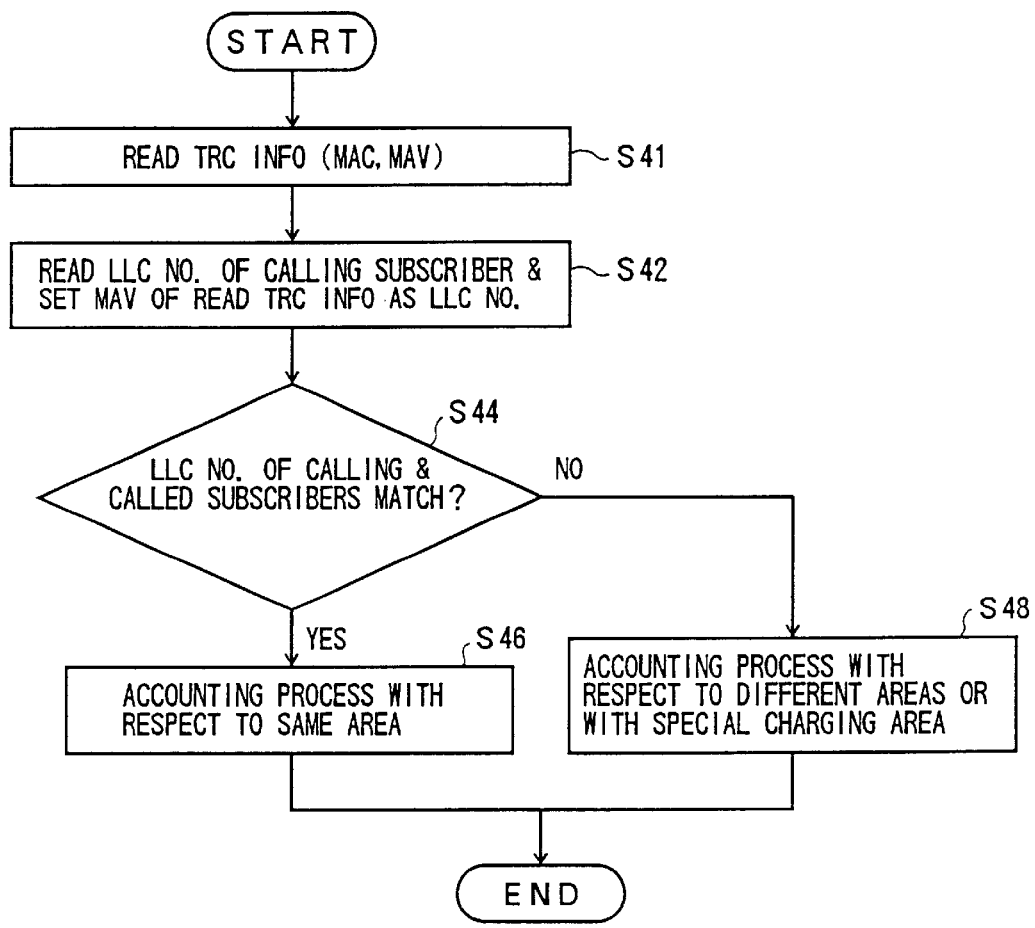
FIG. 12 is a flow chart for explaining an embodiment of an accounting control used in the embodiment of the present invention.

FIG. 12 is a flow chart for explaining an embodiment of an accounting control used in this embodiment of the present invention. When the calling subscriber dials a telephone number, the switching system in a step S41 reads the TRC information, that is, particularly the MAC and the MAV, of the called subscriber telephone number. A step S42 reads the LLC number of the calling subscriber from the LLC registration table, and also sets the MAV of the read TRC information as the LLC number of the called subscriber.

After the step S42, a step S44 decides whether or not the read LLC number of the calling subscriber and the LLC number of the called subscriber. If the decision result in the step S44 is YES, the calling subscriber and the called subscriber have the same area code, and thus, the process advances to a step S46 which carries out an accounting process with respect to the same area code.

On the other hand, if the decision result in the step S44 is NO, the calling subscriber and the called subscriber do not have the same area code. Hence, if the decision result in the step S44 is NO, a step S48 carries out an accounting process with respect to two different area codes or between one area code and a special charging area therein. The process ends after the steps S46 and S48. The steps S44 through S48 function as an accounting process means.

According to the process shown in FIG. 12, it is possible to confirm whether or not the calling subscriber and the called subscriber have the same area code, by comparing the LLC numbers thereof. For this reason, it is possible to carry out an appropriate accounting process even in a case where the plurality of area codes are controlled by the single switching system.

Figure 13:
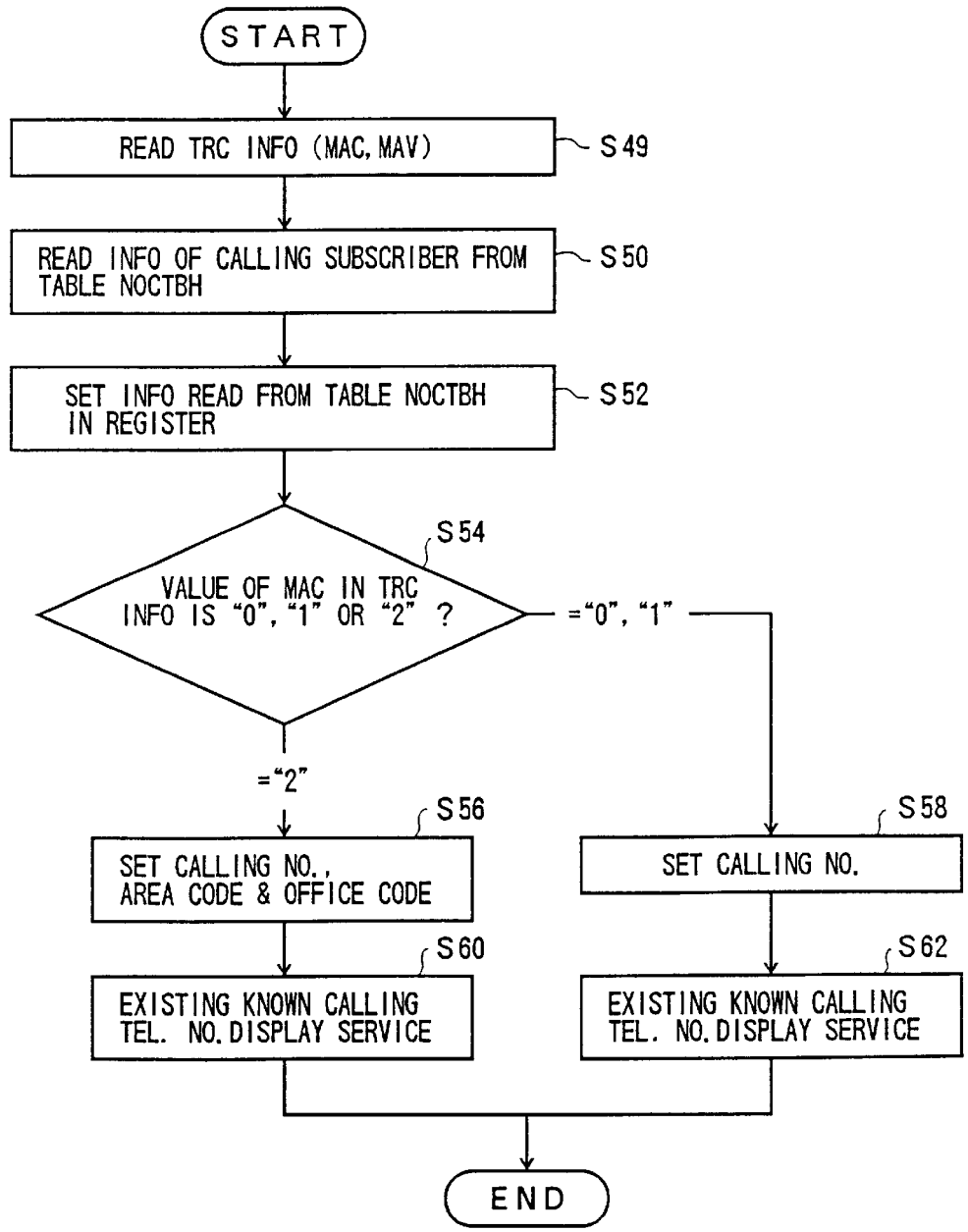
FIG. 13 is a flow chart for explaining an embodiment of a calling telephone number display service function used in the embodiment of the present invention.

FIG. 13 is a flow chart for explaining the calling telephone number display service function used by this embodiment of the present invention. When the calling subscriber dials a telephone number, the switching system in a step S49 reads the TRC information, that is, particularly the MAC and the MAV, of the called subscriber telephone number. A step S50 reads the necessary information such as the area code and the office code of the calling subscriber, from the office number correspondence management table NOCTBH and the area code conversion table ACCT, based on the dialed telephone number, and the process advances to a step S52.

The step S52 reads the calling number of digit part OFCO, the area code of the calling subscriber, and the office code of the calling subscriber from the area code conversion table ACCT, based on the information such as the area code and the office code which are read in the step S50. The step S52 functions as a subscriber information read means.

After the step S52, a step S54 decides whether or not the value of the MAC included in the read TRC information is either "0" or "1" or is "2". If the value of the MAC included in the read TRC information is "0" or "1", a step S58 sets the calling number of digit part OFCO which is detected in the step S52 as an interface data of the calling telephone number display service function, and the process advances to a step S62. The step S62 displays only the subscriber number using an existing known calling telephone number display service function.

On the other hand, if the value of the MAC included in the read TRC information is "2", a step S56 sets the calling number of digit part OFCO, the area code of the calling subscriber and the office code of the calling subscriber which are detected in the step S52 as an interface data of the calling telephone number display service function, and the process advances to a step S60. Because the value of the MAC is "2" and the call connection is made between different area codes or between one area code and a special charging area therein, the step S60 displays the area code and the subscriber number by the existing known calling telephone number display service function. The process ends after the steps S60 and S62. The steps S54 through S58 function as a digit number determination means, and the steps S60 and S62 function as a display means.

According to the process shown in FIG. 13, it is possible to appropriately display the calling telephone number by controlling the calling telephone number display service function depending on whether the value of the MAC included in the read TRC information is either "0" or "1" or is "2".

Further, the present invention is not limited to these embodiments, but various variations and modifications may be made without departing from the scope of the present invention.

What is claimed is:

1. A switching system control method which controls a plurality of area codes by a single telephone switching system, the single telephone switching system having a single host switch at a single switching station, comprising the steps of:

preparing a first table which defines area codes and office codes in a corresponding relationships so that there is no overlap of the office codes and each of the area codes, and a range of the office codes corresponding to each area code has no overlap with ranges of the office codes corresponding to other area codes; and controlling the area codes based on the first table.

2. The switching system control method as claimed in claim 1, further comprising the step of:

preparing a second table which defines subscriber area information by distinguishing control regions of the telephone switching system depending on the area codes and accounting systems.

3. The switching system control method as claimed in claim 2, further comprising the steps of:

detecting area codes and office codes of a calling subscriber and a called subscriber;

detecting the subscriber area information of the calling subscriber and the called subscriber from the second table based on the detected area codes and the detected office codes of the calling subscriber and the called subscriber; and controlling a line connection based on the subscriber area information of the calling subscriber and the called subscriber.

4. The switching system control method as claimed in claim 3, further comprising the steps of:

carrying out an accounting process based on the 5 subscriber area information of the calling subscriber and the called subscriber.

5. The switching system control method as claimed in claim 4, further comprising the steps of:

detecting subscriber information from a third table based on a telephone number dialed by the calling subscriber;

determining a number of digits of a calling telephone number of the calling subscriber to be displayed by a calling telephone number display service, based on the subscriber area information of the calling subscriber and the called subscriber; and displaying the calling telephone number based on the determined number of digits and the detected subscriber information.

6. The switching system control apparatus as claimed in claim 2, wherein the subscriber area information is the same with respect to the same area code of the same telephone switching system and the same accounting system.

7. A switching system control apparatus which controls a plurality of area codes by a single telephone switching system, the single telephone switching system having a single host switch at a single switching station, comprising:

an office number correspondence management table which defines area codes and office codes in a corresponding relationship so that there is no overlap of the office codes and each of the area codes, and a range of the office codes corresponding to each area code has no overlap with ranges of the office codes corresponding to other area codes; and means for controlling the area codes based on the first table.

8. The switching system control apparatus as claimed in claim 7, further comprising:

a subscriber area registration table which defines subscriber area information by distinguishing control regions of the telephone switching system depending on the area codes and accounting systems.

9. The switching system control apparatus as claimed in claim 8, further comprising:

subscriber area information read means for reading the subscriber area information from said subscriber area registration table based on the office codes of the calling subscriber and the called subscriber; and line control means for controlling a line connection based on the subscriber area information of the calling subscriber and the called subscriber.

10. The switching system control apparatus as claimed in claim 9, further comprising:

accounting process means for carrying out an accounting process based on the subscriber area information of the calling subscriber and the call subscriber.

11. The switching system control apparatus as claimed in claim 10, further comprising:

an area code conversion table;

subscriber information read means for reading subscriber information from the area code conversion table based on a telephone number dialed by the calling subscriber;

digit number determination means for determining a number of digits of a calling telephone number of the calling subscriber to be displayed by a calling telephone number display service, based on the subscriber area information of the calling subscriber and the called subscriber; and display means for displaying the calling telephone number based on the determined number of digits and the detected subscriber information.

12. The switching system control apparatus as claimed in claim 8, wherein the subscriber area information is the same with respect to the same area code of the same telephone switching system and the same accounting system.

* * * * *